(12) United States Patent
Billore et al.

(10) Patent No.: US 11,283,860 B2
(45) Date of Patent: Mar. 22, 2022

(54) APPARATUS AND METHOD FOR ADJUSTING RESOURCES IN CLOUD SYSTEM

(71) Applicant: Samsung Electronics Co., Ltd., Suwon-si (KR)

(72) Inventors: Ashish Billore, Suwon-si (KR); Kibeom Nam, Suwon-si (KR); Sohyong Chong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 16/877,172

(22) Filed: May 18, 2020

(65) Prior Publication Data

US 2020/0374339 A1    Nov. 26, 2020

(30) Foreign Application Priority Data

May 20, 2019    (KR) ........................ 10-2019-0058716

(51) Int. Cl.
*H04L 29/08* (2006.01)
*H04L 12/24* (2006.01)
(Continued)

(52) U.S. Cl.
CPC ........ *H04L 67/1004* (2013.01); *G06F 9/4881* (2013.01); *G06F 9/5072* (2013.01);
(Continued)

(58) Field of Classification Search
CPC ............. H04L 67/1004; H04L 41/0206; H04L 41/5003; H04L 47/805; G06F 9/4881; G06F 9/5072; G06F 9/5088
See application file for complete search history.

(56) References Cited

U.S. PATENT DOCUMENTS

2012/0330711 A1    12/2012    Jain et al.
2013/0014101 A1*    1/2013    Ballani ............... G06F 9/45533
                                                        718/1
(Continued)

FOREIGN PATENT DOCUMENTS

CN    102378186 A    3/2012
CN    103713956 A    4/2014
(Continued)

OTHER PUBLICATIONS

International Search Report dated Aug. 27, 2020 in connection with International Patent Application No. PCT/KR2020/006433, 3 pages.

(Continued)

*Primary Examiner* — Azizul Choudhury

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE).
The disclosure relates to an apparatus for resource adjustment in a cloud system, and a method for operating the apparatus. The method includes receiving status information indicating operation performance for a management or control plane (MCP) and one or more user workloads or applications (UWAs) in a host server. The method also includes determining an action related to the resource adjustment based on the status information. The method further includes performing, for the MCP and the one or more UWAs, the action related to the determined resource adjustment.

18 Claims, 13 Drawing Sheets

(51) Int. Cl.
- *G06F 9/50* (2006.01)
- *G06F 9/48* (2006.01)
- *H04L 12/927* (2013.01)
- *H04L 67/1004* (2022.01)
- *H04L 41/02* (2022.01)
- *H04L 41/5003* (2022.01)
- *H04L 47/80* (2022.01)

(52) U.S. Cl.
CPC ........ *G06F 9/5088* (2013.01); *H04L 41/0206* (2013.01); *H04L 41/5003* (2013.01); *H04L 47/805* (2013.01)

(56) References Cited

U.S. PATENT DOCUMENTS

| | | |
|---|---|---|
| 2015/0324232 A1 | 11/2015 | Wang |
| 2018/0060136 A1 | 3/2018 | Herdrich et al. |
| 2018/0165130 A1 | 6/2018 | Beveridge et al. |
| 2020/0241941 A1* | 7/2020 | Gonczi .................. H04L 9/3247 |
| 2020/0351254 A1* | 11/2020 | Xiong .................. H04L 63/029 |

FOREIGN PATENT DOCUMENTS

| | | |
|---|---|---|
| EP | 2961136 B1 | 5/2017 |
| EP | 3402163 A1 | 11/2018 |

OTHER PUBLICATIONS

Written Opinion of the International Searching Authority dated Aug. 27, 2020 in connection with International Patent Application No. PCT/KR2020/006433, 5 pages.

* cited by examiner

APPARATUS AND METHOD FOR ADJUSTING RESOURCES IN CLOUD SYSTEM

CROSS-REFERENCE TO RELATED APPLICATION

This application is based on and claims priority under 35 U.S.C. 119 to Korean Patent Application No. 10-2019-0058716 filed on May 20, 2019 in the Korean Intellectual Property Office, the disclosure of which is herein incorporated by reference in its entirety.

BACKGROUND

1. Field

The disclosure generally relates to a cloud system, and more particularly to an apparatus and method for adjusting resources in a cloud system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a 5G system capable of supporting a high data transfer rate is built, services requiring a large volume of data such as autonomous driving and virtual reality (VR) may be provided. In order to efficiently process such a large volume of data, research is being conducted on technologies related to edge computing-based Internet of Things (IoT), 5G, and network functions virtualization (NFV) cloud systems in which micro data centers and distributed small servers process data in order to perform a real-time response to the large volume of data and overcome the limitations of a network bandwidth.

SUMMARY

Based on the discussion described above, the disclosure provides an apparatus and method for effectively adjusting resources in a cloud system.

In addition, the disclosure provides an apparatus and method for dynamically adjusting resource allocation in a host server according to the current state of a host server in the cloud system.

According to various embodiments, a method for operating an apparatus for resource adjustment in a cloud system may include: receiving status information indicating operation performance for a management or control plane (MCP) and one or more user workloads or applications (UWAs) in a host server; determining an action relating to resource adjustment based on the status information; and performing, for the MCP and the one or more UWAs, the determined action relating to the resource adjustment.

According to various embodiments, an apparatus for resource adjustment in a cloud system includes: a transceiver; and at least one processor operably connected to the transceiver, wherein the at least one processor is configured to receive status information indicating operation performance for MCP and one or more UWAs in a host server, determine an action relating to resource adjustment based on the status information, and perform, for the MCP and the one or more UWAs, the determined action relating to the resource adjustment.

An apparatus and method according to various embodiments may, for a management or control plane (MCP) and user workloads or applications (UWA) sharing resources in a host server, dynamically adjust the resources based on status information of the MCP and the UWA, so as to adaptively allocate the resources according to operating conditions changed in real time.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
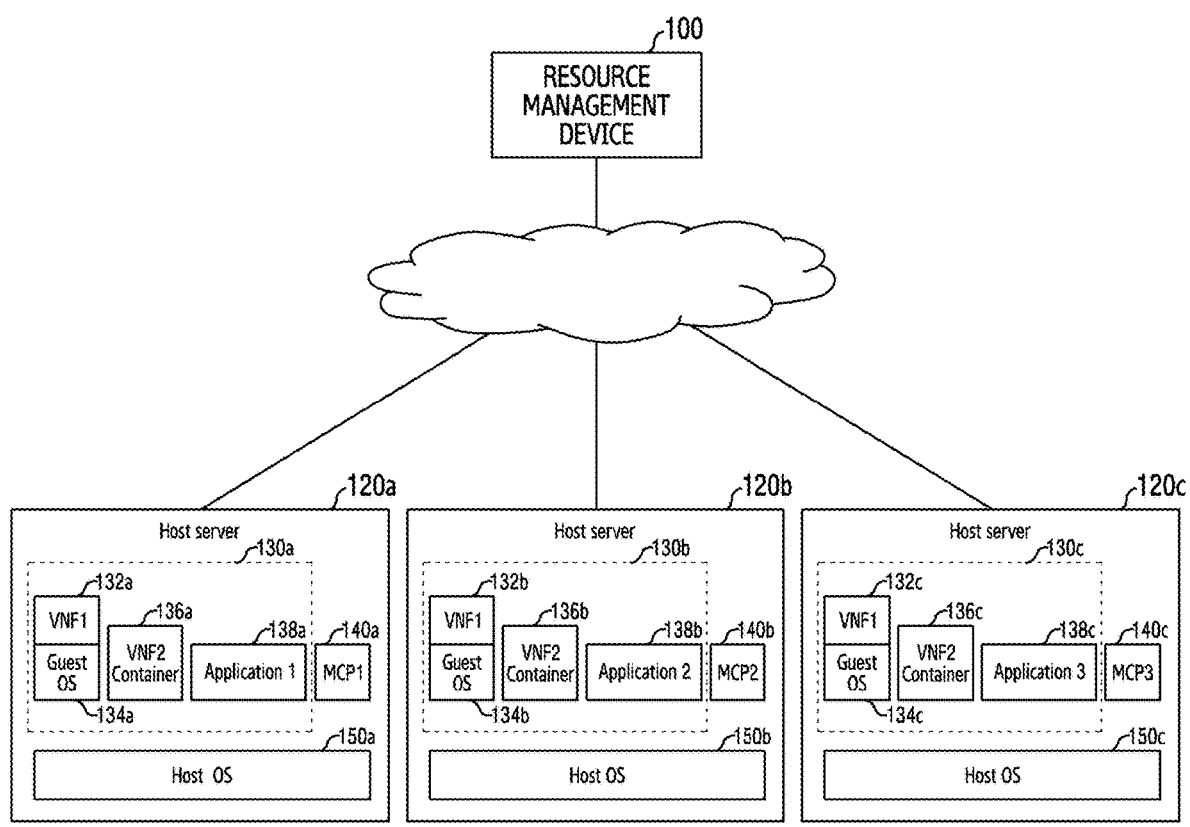
FIG. 1 illustrates a cloud system according to various embodiments.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for adjusting resources in a host server in a cloud system. Specifically, the disclosure describes a technology for dynamically adjusting resources based on real-time status information of a management or control plane (MCP) and user workloads or applications (UWA) in a host server in a cloud system.

Terms referring to network entities, terms referring to modules in a network entity, terms referring to elements of a device, terms referring to data stored in the network entity, and terms referring to resources, which are used in the following description, are exemplified for the convenience of explanation. Therefore, the disclosure is not limited to terms described below, and another term having a technical meaning equivalent thereto may be used.

In general, a cloud infrastructure capable of provisioning virtual machines (VMs), containers, or services may largely include two categories of entities, that is, MCP and UWA. The MCP may be understood as services or applications by which monitoring, control, and correction actions can be taken based on events or errors in a system, in order to perform provisioning and provide and guarantee availability of the infrastructure for maintaining the desired state of UWA. The MCP provides infrastructure elements of a cloud system and functions of achieving the objective of maintaining the life cycle of UWAs. The MCP may be disposed in various formats, such as operating system services, separate virtual machines, or containers. The UWA may be understood as services or applications that provides end users with actual functions, such as data processing for analytic applications, packet processing for network functions virtualization (NFV) applications, or application programming interface (API) request processing for web applications. The UWAs may also be disposed in various formats, such as virtual machines, containers, and functions as a service (FaaS).

In general, resources for MCP may be provisioned through methods which will be described below. In a case that separate servers or virtual machines are used in order to execute MCP, that is, in a case that MCP and UWA are provided through separate servers, modules in MCP can be provisioned, maintained, and extended for separate resources. This method can be generally used in the deployment of a cloud system related to the management of large scale servers (e.g., 100 servers or 1000 servers). On the other hand, if MCP and UWAs are provided from the same server, the MCP and UWAs may share resources. This method can be used in micro data centers and Internet of Things (IoT), 5th generation (5G), and NFV cloud systems related to edge computing. In this case, since the size of the cloud infrastructure is small (generally 10 servers or less), allocation of dedicated resources for MCP is inefficient and may cause overhead.

The disclosure describes a system for controlling resources shared between MCP and UWA provided in the same server in a general cloud environment, and in particular, a system for implementing a next-generation network infrastructure such as 5G in an NFV system.

Although resource sharing between MCP and UWA provides the flexibility capable of generating and operating small cloud infrastructures for 5G and NFV cloud systems related to edge computing, there is a problem in that a single host server does not consider various elements related to determination on optimal resource sharing between MCP and UWA. Specifically, resources (e.g., the size of a virtual machine, virtual central processing units (CPUs), memory, disk space, graphics processing units (GPUs), etc.) for MCP are allocated at an initial deployment time point based on a specific assumption. However, actual operating conditions change rapidly in micro data centers and NFV cloud environments, and thus the initial assumption does not match actual usage conditions. In addition, in the case of modules in a specific MCP, the modules are arranged in a host operating system (OS) in which direct resource competition with UWA in a host server occurs regardless of resource availability condition in the host server.

In order to improve resource efficiency and cost efficiency, computing nodes often share resources between MCP and UWA. Even in a case that the MCP is provided by a separate server from the UWA, specific management modules (e.g., agents) are arranged in host servers that use resources shared by the UWA. In addition, in a case that the MCP and the UWA are provided from the same server, static splitting of resources between the MCP and the UWA may generate over-provisioning for the MCP or the UWA so as to derive an inefficient system configuration in which resources are excessively allocated to MCP, or may generate under-provisioning for the MCP so as to cause deterioration of a control function and quality of service (QoS) of the MCP.

Due to the elements and the limitations described above, MCP that performs the control function operates in a state below the optimum state, particularly in an actual use environment of edge computing or a small cloud system having a strict latency service level agreement (SLA). In general, in a case that a cloud system is designed, MCP does not directly contribute to a result that end users may recognize, and thus the MCP is considered to be overhead and is ignored. However, in the case of 5G, NFV, and IoT cloud systems, dynamic provisioning of services results in continuous interaction of management and monitoring, and closed-loop operation, so that QoS for the MCP needs to be monitored and maintained.

Hereinafter, the disclosure describes methods capable of achieving optimal QoS and SLA of both MCP and UWA, required for a cloud environment, by dynamically controlling the resource allocation situation of MCP and UWA arranged in the same host server.

FIG. 1 illustrates a cloud system according to various embodiments. The cloud system of FIG. 1 includes a resource management device 100, and host servers 120a, 120b, and 120c.

The resource management device 100 is a device for adjusting resources allocated to MCPs and UWAs disposed in the host servers 120a to 120c. The resource management device 100 monitors the operation status of each of MCP and UWAs of each of the host servers 120a to 120c, and performs a function of adjusting resources allocated to each of the MCP and UWAs, which share resources in a single host server. For example, the resource management device 100 may receive status information including high availability (HA), resource availability, service level agreement (SLA), quality of service (QoS), and the like of MCP and UWAs disposed in each of the host servers 120a, 120b, and 120c, and may determine whether to increase resources for the MCP or UWAs. In order to perform functions described above, the resource management device 100 may include a plurality of functionally separated entities. Hereinafter, for convenience of description, the disclosure describes the resource management device 100 as a device separately located outside the host servers, but is not limited thereto. That is, the resource management device 100 may exist as a part of an MCP configuration in the host server, or may perform the functions described above as a separate device from the host server.

The host servers 120a, 120b, and 120c are devices for providing cloud services. The host server 120a may include UWAs 130a, MCP 140a, and a host OS 150a. The UWAs 130a may include virtual network function (VNF 1) 132a, guest OS 134a, VNF container 2 136a, and application 1 138a. The UWAs 130a perform a function of providing, to a user, various functions, such as data processing for an analysis application, packet processing for an NFV application, or API request processing for a web application. In addition, the MCP 140a performs control functions of maintaining the life cycle of elements of the cloud system and UWAs 130a. In addition, the host OS 150a performs functions of managing all of hardware and software configurations of the host server 120a. According to various embodiments, the host servers 120b and 120c may include elements equivalent to the host server 120a.

Figure 2:
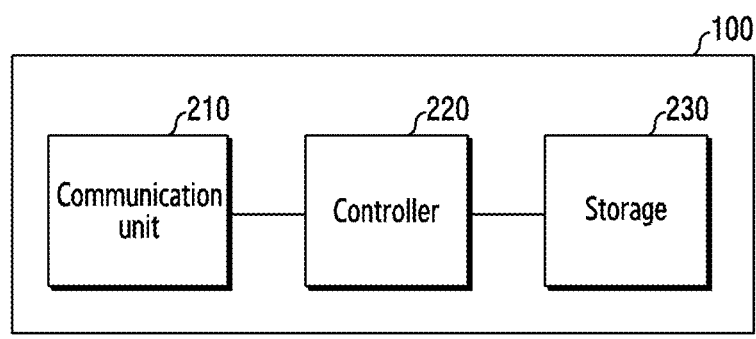
FIG. 2 illustrates a configuration of a resource management device in a cloud system according to various embodiments.

FIG. 2 illustrates a configuration of a resource management device in a cloud system according to various embodiments. The configuration illustrated in FIG. 2 may be understood as a configuration of the resource management device 100. Hereinafter, the term "unit" or the term ending with the suffix "~er" or "~or" refers to a unit for processing at least one function or operation and these terms may be implemented by using hardware or software or a combination of hardware and software.

Referring to FIG. 2, the resource management device includes a communication unit 210, a controller 220, and a storage 230.

The communication unit 210 may perform functions for transmitting or receiving information. Specifically, the communication unit 210 may provide an interface for performing communication with other nodes in a network. That is, the communication unit 210 converts a bit string, transmitted from the resource management device to another node, for example, host servers (e.g., the host servers 120a, 120b, and 120c), into a physical signal, and converts the physical signal received from the host server into a bit string. The communication unit 210 may perform functions of transmitting or receiving signals in a wireless or wired communication environment. For example, the communication unit 210 may perform a conversion function between a baseband signal and a bit string according to a physical layer standard of a system. In addition, the communication unit 210 may include a plurality of transmission/reception paths.

The communication unit 210 transmits or receives signals as described above. Accordingly, the communication unit 210 may be referred to as a "transmitter", a "receiver", and a "transceiver'. In addition, in the following description, transmission and reception are used to include performing the processing described above by the communication unit 210.

The communication unit 210 may receive status information of MCP and UWA from the host server. The status information of the MCP and the UWA may include information, which is considered to determine whether the MCP and the UWA located in the host server operate in order to satisfy a predetermined criterion. The communication unit 210 may transmit, to the corresponding host server, a signal indicating execution of an action relating to resource adjustment of the MCP and the UWA in the host server.

The controller 220 controls the overall operations of the resource management device. For example, the controller 220 transmits or receives signals through the communication unit 210. In addition, the controller 220 records or reads data in or from the storage 230. To this end, the controller 220 may include at least one processor.

The controller 220 may determine whether the MCP and UWA requires resource adjustment, based on the status information of the MCP and UWA, and may determine to perform an action relating to resource adjustment according to a result of the determination. According to various embodiments, the controller 220 may control the resource management device to perform operations according to various embodiments described below.

The storage 230 stores data such as a basic program, an application program, and configuration information for the operation of the resource management device. The storage 230 may include a volatile memory, a nonvolatile memory, or a combination of a volatile memory and a nonvolatile memory. In addition, the storage 230 provides the stored data at the request of the controller 220. According to various embodiments, the storage 230 may store predetermined values with respect to metrics, which are considered to determine whether an increase in resources for MCP or UWA is required. In addition, the storage 230 may store information for determining actions relating to resource adjustment according to the status information of the MCP and UWA in a host server.

Hereinafter, referring to FIGS. 3 to 13, detailed operations of the resource management device, for dynamically controlling the resource allocation situation of MCP and UWAs disposed in the same host server, will be described.

Figure 3:
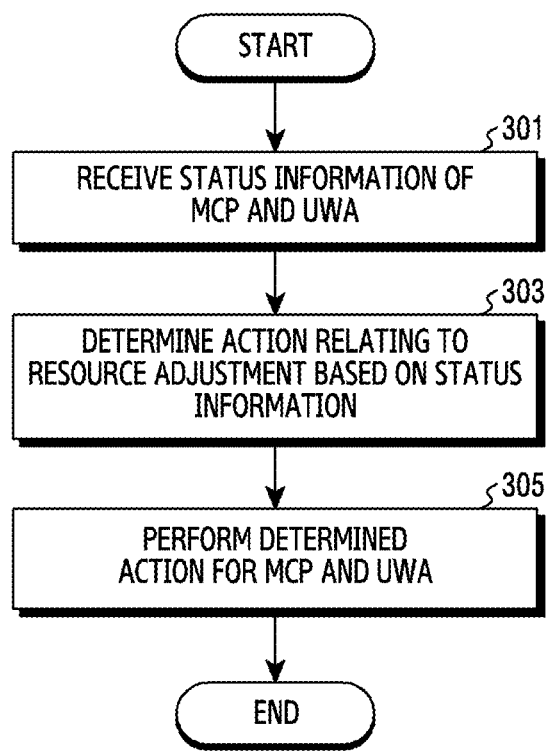
FIG. 3 is a flowchart illustrating an operation of a resource management device in a cloud system according to various embodiments.

FIG. 3 is a flowchart illustrating an operation of a resource management device in a cloud system according to various embodiments. FIG. 3 exemplarily illustrates an operation method for the resource management device 100.

Referring to FIG. 3, in operation 301, the resource management device receives the status information of MCP and UWA. The resource management device may receive, from one or more host servers, status information of MCP and one or more UWAs disposed in each host server. More specifically, the resource management device may periodically receive, from the host servers, status information relating to the operation performance of the MCP and the UWAs in a resource situation at a specific time point, and may use the received status information in order to determine whether the MCP or at least one of the UWAs requires resource adjustment. For example, the status information may include high availability (HA) for the MCP and each of the UWAs, service level agreement (SLA) for the MCP and each of the UWAs, quality of service (QoS) for the MCP and each of the UWAs, resource availability of the host server, and a load level for the MCP and each of the UWAs. The status information may include numerical values for various metrics described above. The resource management device may compare the numerical value with a predetermined value, so as to identify whether the MCP and the UWAs are in a situation requiring the resource adjustment.

In operation 303, the resource management device determines an action relating to resource adjustment based on the status information. More specifically, the resource management device may determine whether the MCP and the UWAs are in a situation requiring the resource adjustment by comparing values of metrics, included in the received status information, with predetermined values. For example, in a case that the values of the metrics for the MCP and the values of the metrics for the UWAs satisfy a predetermined criterion, the resource management device may determine to maintain the current resource situation for the MCP and each of the UWAs. In addition, in a case that at least one of the values of the metrics for the MCP does not satisfy a predetermined criterion, the resource management device may determine to perform additional resource allocation to the MCP. In addition, in a case that at least one of the values of the metrics for the UWAs does not satisfy a predetermined criterion, the resource management device may determine to perform additional resource allocation to the UWAs. In this case, a resource allocation method may be determined based on the priorities of the MCP and the UWAs disposed in the host server and a type of metric that does not satisfy a predetermined criterion.

According to various embodiments, the priorities of the MCP and the UWAs and predetermined criteria relating to metrics, as information relating to a scheduling policy, may be pre-acquired by and stored in a resource management device. In addition, information relating to the scheduling policy may be periodically updated. According to various embodiments, the scheduling policy may include allowable QoS for the MCP and each of the UWAs, allowable HA for the MCP and each of the UWAs, allowable SLA for the MCP and each of the UWAs, the priorities of the UWAs, the priorities of modules within the MCP, the maximum resource allocation amount for the MCP and each of the UWAs, the minimum resource allocation amount for the MCP and each of the UWAs, and the like.

In operation 305, the resource management device performs the determined action for the MCP and the UWAs. If both the MCP and the UWAs are determined not to require resource adjustment, the resource management device may perform an action to maintain the current resource allocation status of the MCP and the UWAs. In addition, if the MCP and the UWAs are determined to require resource adjustment, the resource management device may perform an action relating to resource adjustment determined by status information and information relating to a scheduling policy. For example, the resource management device may adjust resource splitting between the MCP and the UWAs and cluster sizes of the MCP and the UWAs according to the types of metrics that do not satisfy a predetermined criteria and the priorities of the MCP and the UWAs, or may adjust resources using resources allocated to some modules of the MCP. According to various embodiments, actions related to resource adjustment are repeatedly performed according to the periodic reception of status information, and the resource management device repeatedly performs the processes described above so as to maintain the operation performance of the MCP and the UWAs of the host server at a predetermined level or higher.

As described above, the resource management device may determine an action relating to resource adjustment and the amount of resource adjustment, based on status information and information relating to a scheduling policy. According to an embodiment, an operation of determining the action relating to resource adjustment and the amount of resource adjustment may be more automatically performed using machine learning-based modeling.

Figure 4:
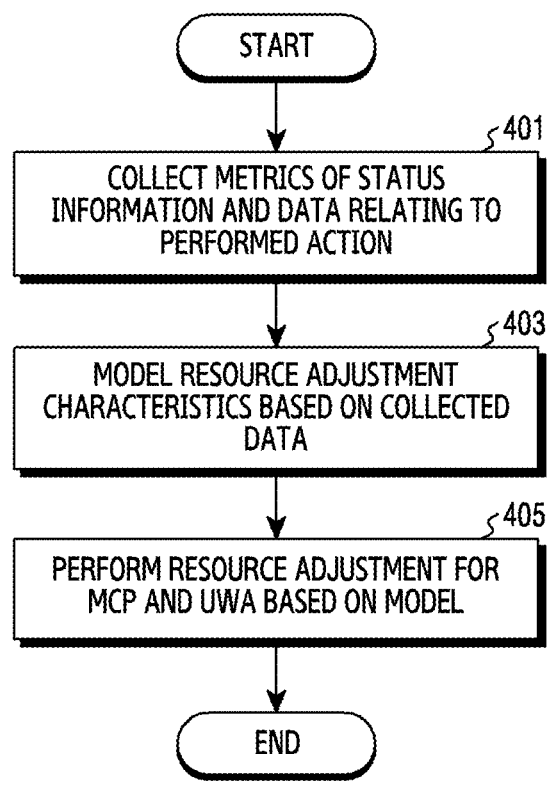
FIG. 4 is a flowchart illustrating an algorithm of performing resource adjustment using machine learning in a cloud system according to various embodiments.

FIG. 4 is a flowchart illustrating an algorithm of performing resource adjustment using machine learning in a cloud system according to various embodiments. FIG. 4 illustrates an operation method for the resource management device 100.

In operation 401, the resource management device collects metrics of status information and data relating to performed actions. More specifically, the resource management device may receive status information indicating the operation performance of the MCP and the UWAs from a host server, and may determine an action related to resource adjustment to be performed, based on the values of metrics, identified from the status information, and information relating to a scheduling policy. Here, the resource management device may perform the process described above without information on the amount of resources that needs to be adjusted to allow the metrics related to the operation of the MCP and the UWAs to achieve a predetermined criteria. That is, the resource management device may determine an action by predicting the degree of improvement of the metric value according to the resource adjustment amount. After performing the determined action, the resource management device may receive the status information of the MCP and the UWAs, to which the result obtained by performing the action is reflected. In this case, a reinforcement learning method and a loss function may be used for resource adjustment characteristic modeling. The resource management device may obtain information on evaluation (e.g., reward) for the performed action, and information on a difference (e.g., a loss) between a predicted value for the degree of improvement of the metric value and an actual measurement value therefor. The resource management device may repeatedly perform the process described above, and may store status information received at each time point, performed actions, evaluation of the performed actions, and data relating to a difference between the predicted value for the degree of improvement of the metric value and the actual measurement value therefor.

In operation 403, the resource management device models resource adjustment characteristics based on the collected data. The resource management device may generate a resource adjustment characteristic model from various resource allocation situations obtained by repetitive execution of resource adjustment, a resource adjustment action corresponding to status information, and data on the amount of resource adjustment. Specifically, in a case that the MCP and the UWAs indicate a specific operation performance in a specific resource allocation situation for the MCP and the UWA, the resource management device may select an action and a resource adjustment amount, the compensation value of which is evaluated as the highest in the corresponding situation. The resource management device may generate a model for resource adjustment characteristics by selecting an action and a resource adjustment amount having the highest compensation value for each situation.

In operation 405, the resource management device performs resource adjustment for the MCP and the UWAs based on the model. As described in operation 403, the resource management device may perform resource adjustment for optimally maintaining the performance and the cloud environment of the MCP and the UWAs, based on a model generated based on resource allocation status and status information of MCP and the UWAs in the host server. In addition, the model used by the resource management device may be continuously updated and changed according to acquisition of new information.

The operation of FIG. 4 has been described as being performed by the resource management device, but according to another embodiment, operations 401 and 403 may be performed by another device. In this case, another device may model the resource adjustment characteristics and provide the generated model to the resource management device.

Figure 5:
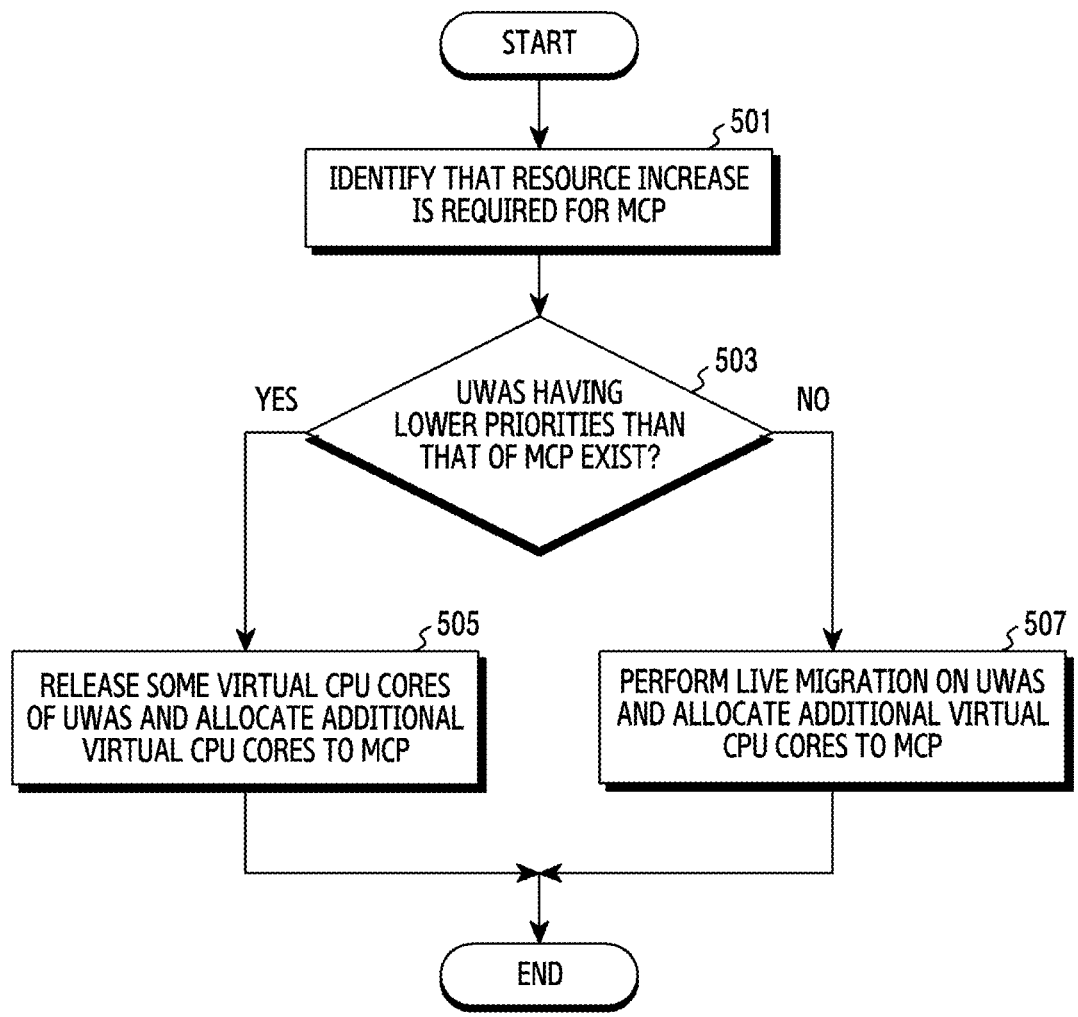
FIG. 5 is a flowchart illustrating adjustment of resource splitting between a management or control plane (MCP) and user workloads or applications (UWA) in a cloud system according to various embodiments.

FIG. 5 is a flowchart for illustrating adjustment of resource splitting between MCP and UWAs in a cloud system according to various embodiments. FIG. 5 illustrates an operation method for the resource management device 100.

Referring to FIG. 5, in operation 501, the resource management device identifies that an increase in resources for MCP is required. The resource management device may identify that an increase in resources is required for the MCP based on status information of the MCP and the UWAs, received from the host server. That is, the resource management device may determine whether at least one module in the MCP is in a situation in which many requests suddenly occur or whether the MCP is in a situation requiring additional resources in order to perform a specific task, based on the status information. According to an embodiment, the resource management device may determine that the MCP is in a situation where the number of virtual CPU cores allocated to the MCP needs to be increased. For example, in a case that a load level of the MCP, included in the status information, is identified as having a value equal to or greater than a predetermined value, the resource management device may determine that the MCP is in a situation requiring additional resources. In addition, in a case that the number of data requests for at least one module in the MCP is identified as having a value equal to or greater than a predetermined value, the resource management device may determine that the MCP is in a situation requiring additional resources. In a case that at least one of the load level and the number of data requests is identified as having a value equal to or greater than a predetermined value, the resource management device may allocate more resources to the MCP so as to allow MCP to process data while maintaining performance.

In operation 503, the resource management device may identify whether there are UWAs having lower priorities than that of the MCP. Specifically, the resource management device may identify the priorities of modules of the MCP, currently occupying resources in a host server, and the priorities of the UWAs, based on information about a pre-stored scheduling policy. The resource management device may compare the priorities of the UWAs with the priorities of the modules in the MCP, in which at least one of the load level and the number of data requests is identified as having a value equal to or greater than a predetermined value, based on the priorities identified from the information relating to the scheduling policy. According to an embodiment, whether there are sufficient UWAs having lower priorities than that of the MCP may be determined based on the amount of resources currently occupied by the UWAs having relatively lower priorities. According to an embodiment, whether there are sufficient UWAs having lower priorities than that of the MCP may be determined according to whether there are a predetermined number or more of UWAs having relatively lower priorities. According to some embodiments, operation 503 may be performed in parallel with operation 501.

If it is identified that there are sufficient UWAs having lower priorities than that of the MCP, in operation 505, the resource management device releases some virtual CPU cores of the UWAs and allocates additional virtual CPU cores to the MCP. More specifically, the resource management device may release some of the virtual CPU cores allocated to UWAs having lower priorities than that of the MCP. The resource management device may allocate the released virtual CPU cores to a module in the MCP, in which at least one of the load level and the number of data requests is identified as having a value equal to or greater than a predetermined value, so as to enable the MCP to execute services using more resources. According to an embodiment, some virtual CPU cores of all UWAs having lower priorities than that of the MCP may be released and be allocated to the MCP. According to an embodiment, among UWAs having lower priorities than that of MCP, some of the virtual CPU cores of UWAs, as many as required to enable metrics such as a load level of the MCP to satisfy a predetermined level, may be released and allocated, in a sequence in which the lowest priority goes first, to the MCP.

If it is identified that there are not sufficient UWAs having lower priorities than that of the MCP, in operation 507, the resource management device performs live migration on the UWAs, and allocates additional virtual CPU cores to the MCP. According to an embodiment, the resource management device may determine to perform live migration on UWAs having lower priorities than that of the MCP, so as to transfer the UWAs to another host server. According to an embodiment, the resource management device may perform live migration on UWAs having lower priorities than that of the MCP, so as to transfer the UWAs from currently allocated virtual CPU cores to a region in which virtual CPU cores in the same host server are over committed. Accordingly, execution of UWAs having lower priorities than that of the MCP is not interrupted, and may be continued even after the transfer. In a case that live migration is performed, the resource management device may allocate virtual CPU cores that had been allocated to corresponding UWAs to modules in the MCP where at least one of the load level and the number of data requests is identified as having a value equal to or greater than a predetermined value.

As described above, after performing additional allocation of virtual CPU cores to the MCP, if it is identified that values of the load level of the MCP and the number of data requests are reduced to have values smaller than predetermined values, based on new status information, the resource management device may adjust the resource allocation of MCP and UWA so as to go back to a resource allocation situation before the virtual CPU cores are additionally allocated.

Figure 6:
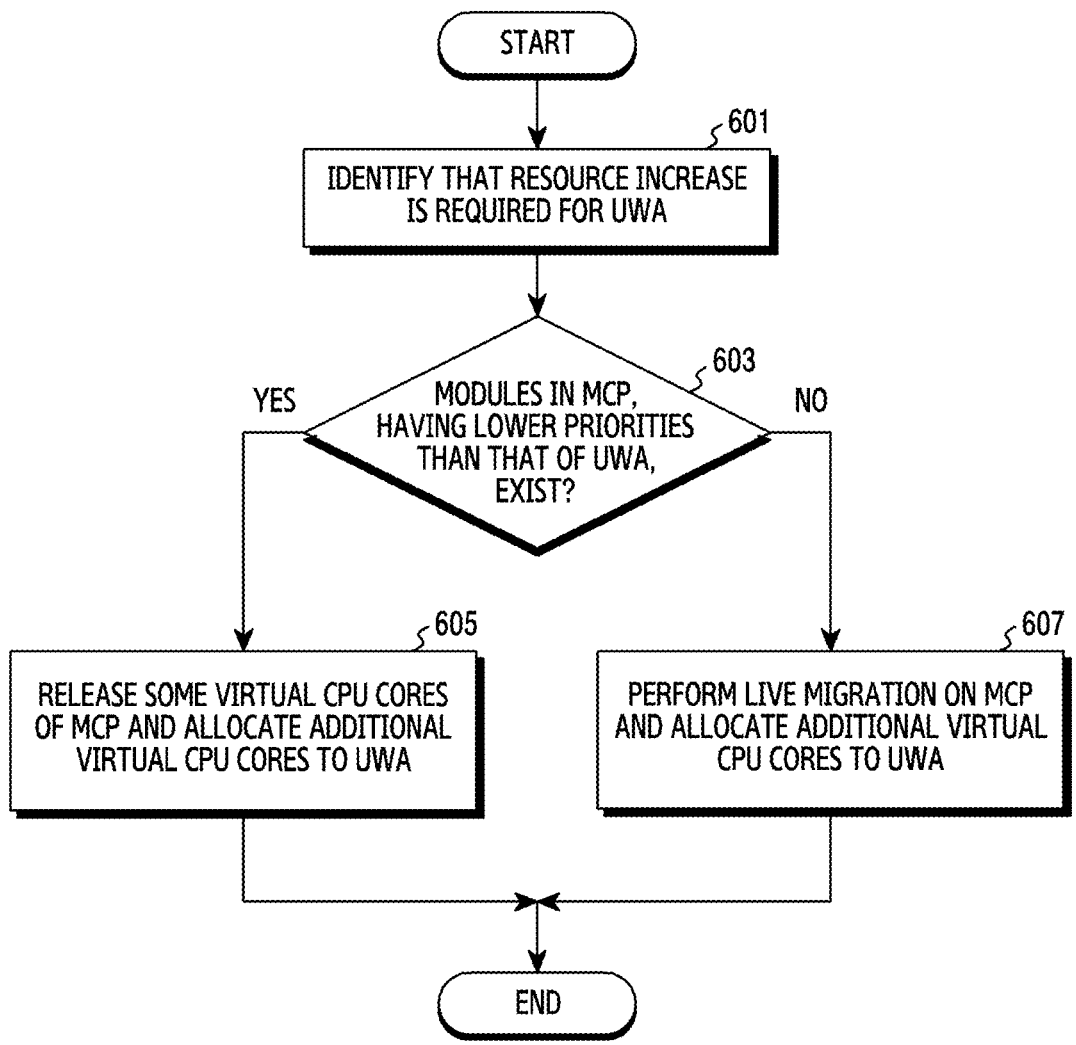
FIG. 6 is another flowchart illustrating adjustment of resource splitting between MCP and UWA in a cloud system according to various embodiments.

FIG. 6 is another flowchart illustrating adjustment of resource splitting between MCP and UWA in a cloud system according to various embodiments. FIG. 6 illustrates an operation method for the resource management device 100.

Referring to FIG. 6, in operation 601, the resource management device identifies that an increase in resources for UWAs is required. The resource management device may identify that an increase in resources is required for the UWAs based on status information of the MCP and the UWAs, received from the host server. That is, the resource management device may determine whether at least one UWA is in a situation in which many requests suddenly occur or whether the least one UWA is in a situation requiring additional resources in order to perform a specific task, based on the status information. According to some embodiments, the resource management device may determine that the UWA is in a situation where the number of virtual CPU cores allocated to the UWA needs to be increased. For example, in a case that a load level of at least one UWA, included in the status information, is identified as having a value equal to or greater than a predetermined value, the resource management device may determine that the UWA is in a situation requiring additional resources. In addition, in a case that the number of data requests for the at least one UWA is identified as having a value equal to or greater than a predetermined value, the resource management device may determine that the UWA is in a situation requiring additional resources. In a case that at least one of the load level and the number of data requests is identified as having a value equal to or greater than a predetermined value, the resource management device may allocate more resources to the UWA so as to allow the UWA to process data while maintaining performance.

In operation 603, the resource management device may identify whether there are modules in the MCP, having lower priorities than that of the UWA. Specifically, the resource management device may identify priorities of modules in the MCP, currently occupying resources in a host server, and relative priorities of UWAs, based on information about a pre-stored scheduling policy. The resource management device may compare priorities of the modules in the MCP with priorities of the UWAs, in which at least one of the load level and the number of data requests is identified as having a value equal to or greater than a predetermined value, based on the priorities identified from the information relating to the scheduling policy. According to an embodiment, whether there are sufficient modules in the MCP, having lower priorities than that of the UWAs, may be determined based on the amount of resources currently occupied by the modules in the MCP having relatively lower priorities. According to an embodiment, whether there are sufficient modules in the MCP, having lower priorities than that of the UWAs, may be determined according to whether there are a predetermined number or more of modules in the MCP having relatively lower priorities. According to an embodiment, operation 603 may be performed in parallel with operation 601.

If it is identified that there are sufficient modules in MCP having lower priorities than that of UWA, in operation 605, the resource management device releases some virtual CPU cores of the MCP and allocates additional virtual CPU cores to the UWA. More specifically, the resource management device may release some of the virtual CPU cores allocated to modules in the MCP, having lower priorities than that of UWAs. The resource management device may allocate the released virtual CPU cores to a UWA in which at least one of the load level and the number of data requests is identified as having a value equal to or greater than a predetermined value, so as to enable the UWA to be executed using more resources. According to an embodiment, some virtual CPU cores, which have been allocated to all modules in MCP having lower priorities than that of UWA, may be released and allocated to the UWA. According to an embodiment, among modules in the MCP, having lower priorities than that of the UWA, some of the virtual CPU cores that have been allocated to the modules in MCP, as many as required to enable metrics such as a load level of UWA to satisfy a predetermined level, may be released and allocated, in a sequence in which the lowest priority goes first, to the UWAs.

If it is identified that there are not sufficient modules in MCP having lower priorities than that of UWA, in operation 607, the resource management device performs live migration on the MCP, and allocates additional virtual CPU cores to the UWA. According to an embodiment, the resource management device may determine to perform live migration on modules in the MCP, having lower priorities than that of the UWA, and may transfer the modules in the MCP to another host server. According to an embodiment, the resource management device may perform live migration on modules in the MCP, having lower priorities than that of the UWA, and may transfer the modules in the MCP from currently allocated virtual CPU cores to a region in which virtual CPU cores in the same host server are over committed. Accordingly, execution of the modules in the MCP, having lower priorities than that of the UWA, is not interrupted, and may be continued even after the transfer. In a case that live migration is performed, the resource management device may allocate virtual CPU cores, which have been allocated to corresponding modules in the MCP, to UWA in which at least one of the load level and the number of data requests is identified as having a value equal to or greater than a predetermined value.

As described above, after performing additional allocation of virtual CPU cores to the UWA, if it is identified that the load level of the UWA and the number of data requests are reduced to have values smaller than predetermined values, based on new status information, the resource management device may adjust the resource allocation of MCP and UWA so as to go back to a resource situation before the virtual CPU cores are additionally allocated.

Figure 7:
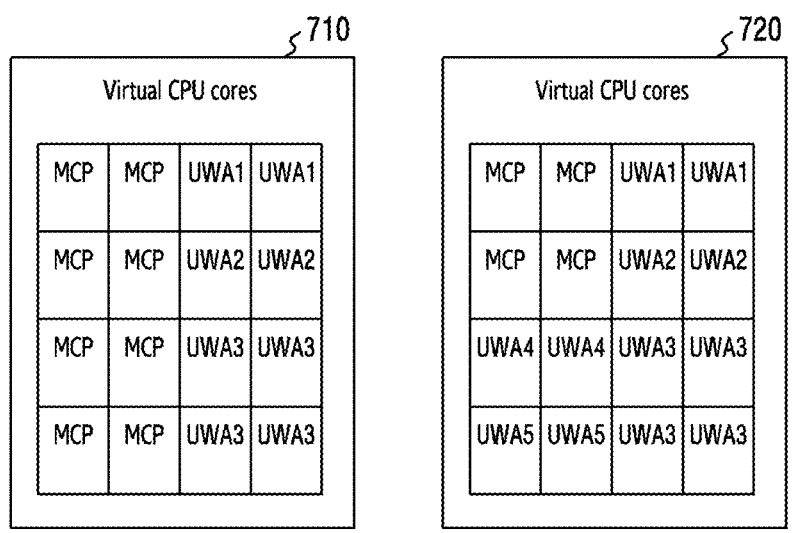
FIG. 7 illustrates an example of adjustment of resource splitting between MCP and UWA in a cloud system according to various embodiments.

FIG. 7 illustrates an example of adjustment of resource splitting between MCP and UWA in a cloud system according to various embodiments. According to various embodiments, the adjustment of resource splitting may be performed by the resource management device 100.

In situation 710, eight virtual CPU cores are allocated to the MCP by the resource management device, and two virtual CPU cores, two virtual CPU cores, and four virtual CPU cores may be allocated to UWA1, UWA2, and UWA3, respectively. In a resource allocation situation, such as situation 710, the resource management device may receive status information from a host server in which MCP, UWA1, UWA2, and UWA3 are arranged, and may identify that the number of data requests for new UWA4 and UWA5 has a value equal to or greater than a predetermined value, based on the status information. In addition, the resource management device may identify modules in MCP having lower priorities than those of UWA4 and UWA5 by comparing the priorities of the modules in the MCP with the priorities of UWA4 and UWA5, obtained from information relating to the scheduling policy. Based on a result obtained by the identification, the resource management device may perform resource adjustment as described in situation 720. For example, the resource management device may release some of the virtual CPU cores that had been allocated to all modules in MCP having lower priorities than those of UWA4 and UWA5, and allocate the released virtual CPU cores to UWA4 and UWA5. The resource management device may release, among modules in MCP having lower priorities than those of UWA4 and UWA5, some of the virtual CPU cores that have been allocated to the modules in MCP, as many as required, and allocate the released virtual CPU cores to UWA4 and UWA5, in a sequence in which the lowest priority goes first. The resource management device may perform live migration on the modules in the MCP, having lower priority than those of UWA4 and UWA5, and may allocate virtual CPU cores allocated to the modules in the corresponding MCP to UWA4 and UWA5. As a result, as described in situation 720, eight virtual CPU cores allocated to the MCP are reduced to four, and two virtual CPU cores can be allocated to each of UWA4 and UWA5.

Figure 8:
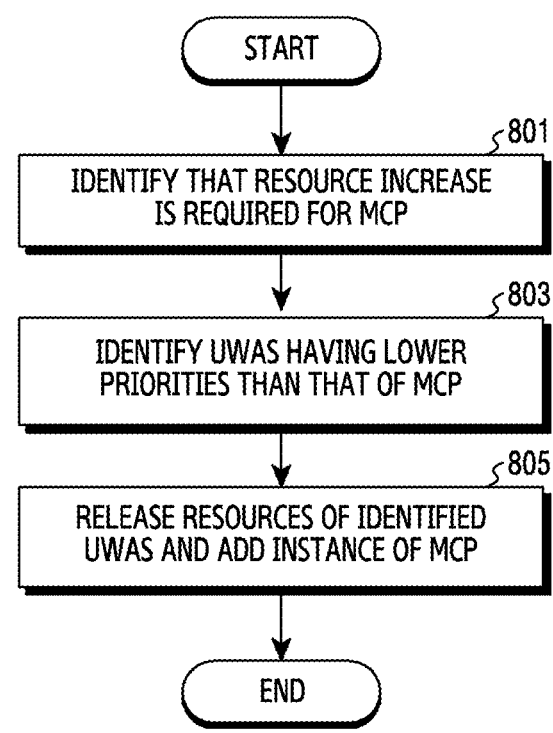
FIG. 8 is a flowchart illustrating adjustment of the sizes of MCP and UWA clusters in a cloud system according to various embodiments.

FIG. 8 is a flowchart illustrating adjustment of the sizes of MCP and UWA clusters in a cloud system according to various embodiments. FIG. 8 illustrates an operation method for the resource management device 100.

Referring to FIG. 8, in operation 801, the resource management device identifies that an increase in resources for the MCP is required. The resource management device may identify that an increase in resources for the MCP is required, based on the status information of the MCP and the UWAs, received from a host server. In this case, the required resources may include a memory, disk space, a GPU, network bandwidth, and the like. According to an embodiment, the resource management device may determine that the MCP is in a situation requiring a resource increase, based on the number of application programming interface (API) requests for at least one module in the MCP, included in the status information. For example, in a case that the number of API requests for at least one module in the MCP is identified as having a value equal to or greater than a predetermined value, the resource management device may determine that the MCP is in a situation requiring additional resources. According to an embodiment, the resource management device may determine that the MCP is in a situation requiring a resource increase, based on HA of the MCP, included in the status information. For example, in a case that the HA of the MCP included in the status information is identified as having a value smaller than a predetermined value, it may be determined that errors having a value equal to or greater than a threshold value occur in the MCP, and thus the resource management device may determine that the MCP is in a situation requiring a resource increase in order to be operate normally.

In operation 803, the resource management device identifies UWAs having lower priorities than that of the MCP. Specifically, the resource management device may identify the priorities of UWAs and the priorities of modules of MCP currently occupying a resource in a host server, based on information relating to a pre-stored scheduling policy. Based on the priorities identified from the information relating to the scheduling policy, the resource management device may compare the priorities of UWAs with the priority of the module in the MCP, in which the number of API requests is identified as having a value equal to or greater than a predetermined value or the HA is identified as having a value smaller than the predetermined value. In a case that there are two or more modules in the MCP, in which the number of API requests is identified as having a value equal to or greater than a predetermined value or the HA is identified as having a value smaller than a predetermined, the resource management device may determine a module in the MCP according to a predefined criterion, and may compare the priority of the determined module of the MCP with the priorities of UWAs. For example, the resource management device may select a module having the lowest priority in the MCP, or may select a module having the highest priority in the MCP. According to some embodiments, operation 803 may be performed in parallel with operation 801.

In operation 805, the resource management device releases resources of the identified UWAs and adds an instance of the MCP. The resource management device may reduce the cluster size of the identified UWAs by releasing the resources of the identified UWAs, and may increase the cluster size of the MCP by additionally generating an MCP instance using the released resources. Here, the cluster size of the UWAs is determined according to the number of host servers in which the corresponding UWA is running, and the cluster size of the MCP is determined according to the number of host servers in which the MCP is running. The resource management device may release all resources allocated to UWAs having lower priorities than that of a module in the MCP. The resource management device may add an instance of the MCP by allocating the released resources to the MCP. In this case, the same UWAs arranged in different host servers may provide UWA services by a host server in which a resource release is performed. According to an embodiment, the resource management device may release all resources of all UWAs having lower priorities than that of the MCP, and may allocate the released resources to the MCP in order to add an instance of the MCP. According to an embodiment, the resource management device may release all resources of UWAs, to which the same type of resources are allocated as resources used by a module in the MCP for priority comparison, among UWAs having lower priorities than that of the MCP, and may allocate the released resources to the MCP in order to add an instance of the MCP.

As described above, resources of UWAs having relatively low priorities are used in order to add an instance of the MCP, so that HA of the MCP may be reconstructed at a desired level. In addition, after increasing the cluster size of the MCP, if it is identified that the number of API requests for the MCP is reduced to have a value smaller than predetermined values, based on the new status information, the resource management device may adjust the resource allocation of the MCP and the UWA so as to go back to a situation before the cluster size of the MCP is increased.

Figure 9:
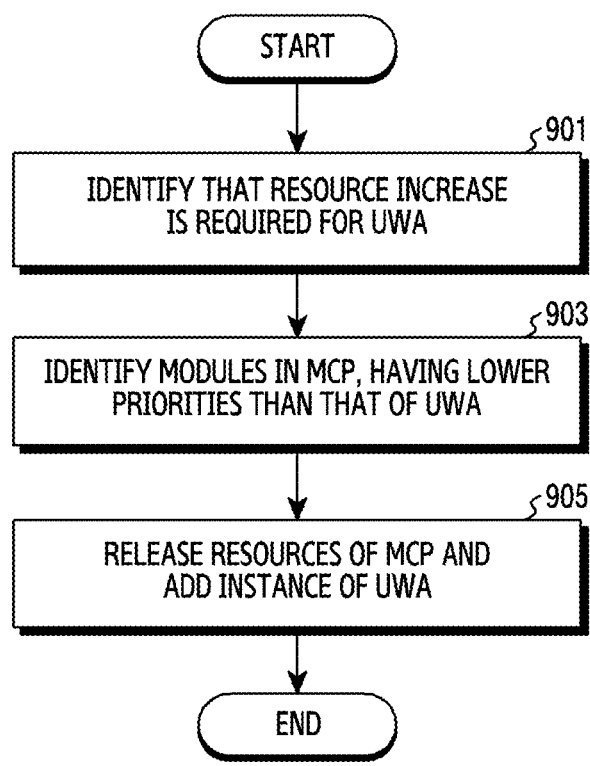
FIG. 9 is another flowchart illustrating adjustment of the sizes of MCP and UWA clusters in a cloud system according to various embodiments.

FIG. 9 is another flowchart illustrating adjustment of the sizes of MCP and UWA clusters in a cloud system according to various embodiments. FIG. 9 illustrates an operation method for the resource management device 100.

Referring to FIG. 9, in operation 901, the resource management device identifies that a resource increase for the UWAs is required. The resource management device may identify that the resource increase is required for the UWAs based on the status information of the MCP and the UWAs, received from a host server. In this case, the required resources may include a memory, a disk space, a GPU, a network bandwidth, and the like. According to an embodiment, the resource management device may determine that the UWA is in a situation requiring a resource increase, based on the number of API requests for at least one UWA, included in the status information. For example, in a case that the number of API requests for at least one UWA is identified as having a value equal to or greater than a predetermined value, the resource management device may determine that the UWA is in a situation requiring additional resources. According to an embodiment, the resource management device may determine that the UWA is in a situation requiring a resource increase, based on HA of the UWA, included in the status information. For example, in a case that the HA of the UWA included in the status information is identified as having a value smaller than a predetermined value, it may be determined that errors having a value equal to or greater than a threshold value occur in the UWA, and thus the resource management device may determine that the UWA is in a situation requiring a resource increase in order to be operate normally.

In operation 903, the resource management device identifies modules in MCP, the modules having lower priorities than that of the UWA. Specifically, the resource management device may identify the priorities of UWAs and the priorities of modules of MCP currently occupying a resource in a host server, based on information relating to a pre-stored scheduling policy. Based on the priorities identified from the information relating to the scheduling policy, the resource management device may compare the priorities of the modules in the MCP with the priorities of UWAs, in which the number of API requests is identified as having a value equal to or greater than a predetermined value or the HA is identified as having a value smaller than the predetermined value. The resource management device may identify at least one module in the MCP, the module having a lower priority than that of the UWA. According to some embodiments, operation 903 may be performed in parallel with operation 901.

In operation 905, the resource management device releases resources of the MCP and adds an instance of the UWA. The resource management device may reduce the cluster size of the MCP by releasing the resources of the MCP disposed in the same host server as the host server in which UWA, which is determined to require a resource increase, is disposed, and may increase the cluster size of the UWA by additionally generating an UWA instance using the released resources. Here, the cluster size of the UWA is determined according to the number of host servers in which the corresponding UWA is running, and the cluster size of the MCP is determined according to the number of host servers in which the MCP is running. The resource management device may release all resources allocated to the MCP, so as to perform control such that no MCP instance exists in the corresponding host server. In this case, MCPs arranged in different host servers may provide services of MCPs of a host server in which resource release is performed.

As described above, resources of the MCP are used in order to add an instance of the UWA, and the HA of the UWA may be reconstructed at a desired level. In addition, after increasing the cluster size of the UWA, if it is identified that the number of API requests for the UWAs is reduced to have a value smaller than predetermined values, based on the new status information, the resource management device may adjust the resource allocation of the MCP and the UWA so as to go back to a situation before the cluster size of the UWA is increased.

Figure 10:
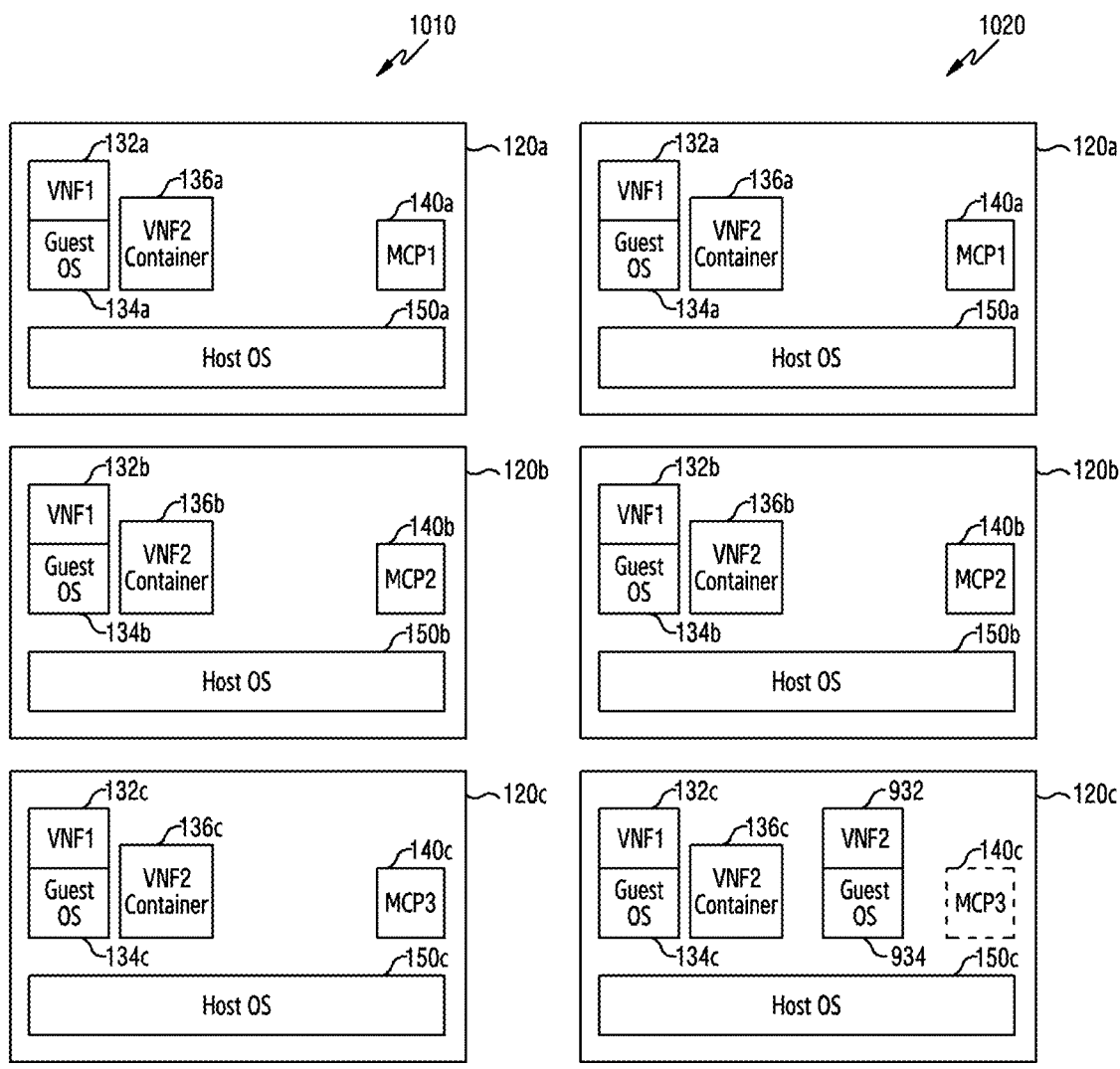
FIG. 10 illustrates an example of adjusting the sizes of MCP and UWA clusters in a cloud system according to various embodiments.

FIG. 10 illustrates an example of adjusting sizes of MCP and UWA clusters in a cloud system according to various embodiments. According to various embodiments, the adjustment of the cluster size may be performed by the resource management device 100.

Referring to situation 1010, the cloud system includes a host server 120a, a host server 120b, and a host server 120c. Since an MCP instance is running in the host servers 120a to 120c, the cluster size of the MCP in situation 1010 corresponds to 3-node. In a resource allocation situation, such as situation 1010, the resource management device may identify that, based on the status information received from the host server 120c, an error having a value equal to or greater than a threshold value occurs in a guest OS 134c and VNF1 132c corresponding to UWA, or that the number of API requests for VNF1 132c and guest OS 134c has a value equal to or greater than a predetermined value. In addition, the resource management device may compare the priorities of the modules in MCP3 140c with the priorities of VNF1 132c and guest OS 134c, obtained from the information relating to the scheduling policy, so as to identify at least one MCP module having lower priority than those of VNF1 132c and guest OS 134c. Based on a result of the identification, the resource management device may perform resource adjustment as described in situation 1020. The resource management device may release all resources allocated to MCP3 140c, and additionally generate UWA instances using the released resources. Referring to the situation 1020, instances of VNF2 932 and guest OS 934 that can provide the same functions as that of VNF1 132c and guest OS 134c may be newly generated. As a result, the size of the MCP cluster may be reduced to a cluster of two nodes, and the size of the UWA cluster may be increased by one node. In this case, since the MCP instance does not temporarily exist in the host server 120c, MCP1 140a of the host server 120a and MCP2 140b of the host server 120b may support functions performed by MCP3 140c.

Figure 11:
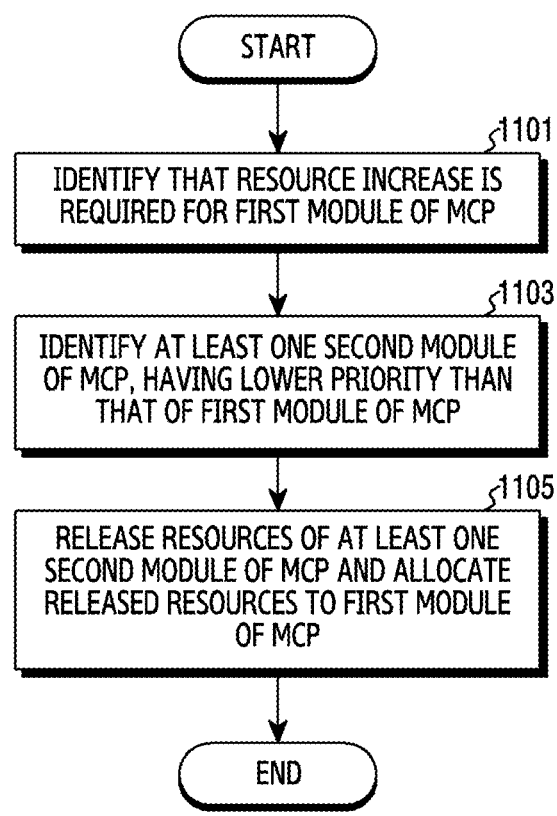
FIG. 11 is a flowchart illustrating an operation of performing resource adjustment using resources allocated to some modules of MCP in a cloud system according to various embodiments.

FIG. 11 is a flowchart illustrating an operation of performing resource adjustment using resources allocated to some modules of MCP in a cloud system according to various embodiments. FIG. 11 illustrates an operation method for the resource management device 100.

Referring to FIG. 11, in operation 1101, the resource management device identifies that an increase in resources is required for a first module of the MCP. The resource management device may identify that an increase in resources is required for the first module of the MCP, based on the status information of the MCP and the UWAs received from the host server. In this case, the required resources may include a memory, a disk space, a GPU, a network bandwidth, and the like. According to an embodiment, in a case that the resource management device identifies that, from the status information, the resource availability of the host server has a value lower than a predetermined value and that SLA of the first module of the MCP does not satisfy a predetermined level, the resource management device may identify that the first module of the MCP is in a situation requiring a resource increase. According to an embodiment, in a case that the resource management device identifies that, from the status information, the resource availability of the host server has a value smaller than a predetermined value and that QoS of the first module of the MCP does not satisfy the predetermined level, the resource management device may identify that the first module of the MCP is in a situation requiring a resource increase. In addition to the cases described above, the resource management device may identify that the first module of the MCP is in a situation requiring a resource increase, based on metrics such as the number of data requests for the first module of the MCP in a situation where the resource availability of the host server is low.

In operation 1103, the resource management device identifies at least one second module of the MCP, having a lower priority than that of the first module of the MCP. Specifically, the resource management device may identify the priorities of UWAs and the priorities of modules in MCP, currently occupying a resource in a host server, based on information relating to a pre-stored scheduling policy. The resource management device may identify at least one second module having a lower priority than that of the first module, based on the priorities identified from the information relating to the scheduling policy. For example, the MCP may include modules that provide various services such as API service, dashboard service, monitoring service, log integration service, log analysis service, scheduler service, and metric collection service. The resource management device may identify second modules having lower priorities than that of a module corresponding to the first module among the modules described above. According to some embodiments, operation 1103 may be performed in parallel with operation 1101.

In operation 1105, the resource management device releases resources of at least one second module of the MCP, and allocates the released resources to the first module of the MCP. The resource management device may allocate resources of modules having relatively lower priorities in MCP to modules having relatively higher priorities in MCP, to allow SLA and QoS having higher priority service to be maintained. According to an embodiment, the resource management device may release resources of all the second modules and allocate the released resources to the first module. According to an embodiment, the resource management device may release only the amount of resources that SLA and QoS of the first module require in order to satisfy a predetermined level, among resources allocated to the second modules. Here, the resource management device may release resources in a sequence in which the lowest priority goes first in the second modules and allocate the released resources to the first module.

As described above, after performing additional resource allocation for the first module of the MCP, if it is identified that SLA and QoS of the first module have been improved to a predetermined level, based on the new status information, the resource management device may adjust resource allocation between modules in MCP so as to go back to a resource allocation situation before resources are additionally allocated.

Figure 12:
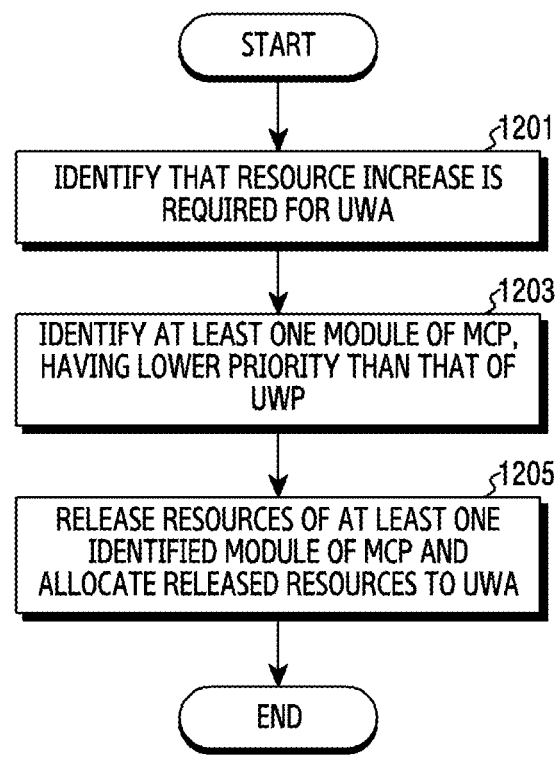
FIG. 12 is another flowchart illustrating an operation of performing resource adjustment using resources allocated to some modules of MCP in a cloud system according to various embodiments.

FIG. 12 is another flowchart illustrating an operation of performing resource adjustment using resources allocated to some modules of MCP in a cloud system according to various embodiments. FIG. 12 illustrates an operation method for the resource management device 100.

Referring to FIG. 12, in operation 1201, the resource management device identifies that an increase in resources is required for UWA. The resource management device may identify that an increase in resources is required for the UWA, based on the status information of the MCP and the UWA received from the host server. In this case, the required resources may include a memory, disk space, a GPU, network bandwidth, and the like. According to an embodiment, in a case that the resource management device identifies that, from the status information, the resource availability of the host server has a value smaller than a predetermined value and that SLA of the UWA does not satisfy a predetermined level, the resource management device may identify that the UWA is in a situation requiring a resource increase. According to an embodiment, in a case that the resource management device identifies that, from the status information, the resource availability of the host server has a value smaller than a predetermined value and that QoS of the UWA does not satisfy the predetermined level, the resource management device may identify that the UWA is in a situation requiring a resource increase. In addition to the cases described above, the resource management device may identify that the UWA is in a situation requiring a resource increase, based on metrics such as the number of data requests for the UWA in a situation where the resource availability of the host server is low.

In operation 1203, the resource management device identifies at least one module of the MCP, having a lower priority than that of the UWA. Specifically, the resource management device may identify the priorities of UWAs and the priorities of modules in MCP, currently occupying a resource in a host server, based on information relating to a pre-stored scheduling policy. The resource management device may identify at least one module in MCP, having a lower priority than that of the UWA, based on the priorities identified from the information relating to the scheduling policy. For example, the MCP may include modules that provide various services such as API service, dashboard service, monitoring service, log integration service, log analysis service, scheduler service, and metric collection service. The resource management device may identify modules having lower priorities than that of the UWA among the modules described above. According to some embodiments, operation 1203 may be performed in parallel with operation 1201.

In operation 1205, the resource management device releases resources of at least one module of the MCP, and allocates the released resources to the UWA. The resource management device may allocate resources of modules having relatively lower priorities in MCP to UWA having a relatively high priority, to allow SLA and QoS of UWA having a higher priority service to be maintained. According to an embodiment, the resource management device may release resources of all the identified modules of MCP and allocate the released resources to the UWA. According to an embodiment, the resource management device may release only the amount of resources that SLA and QoS of the UWA requires in order to satisfy a predetermined level, among resources allocated to the identified modules. Here, the resource management device may release resources in a sequence in which the lowest priority goes first in the identified modules of the MCP and allocate the released resources to the UWA.

As described above, after performing additional resource allocation for the first module of the MCP, if it is identified that SLA and QoS of the UWA have been improved to a predetermined level, based on the new status information, the resource management device may adjust resource allocation between MCP and UWA so as to go back to a resource allocation situation before resources are additionally allocated.

Figure 13:
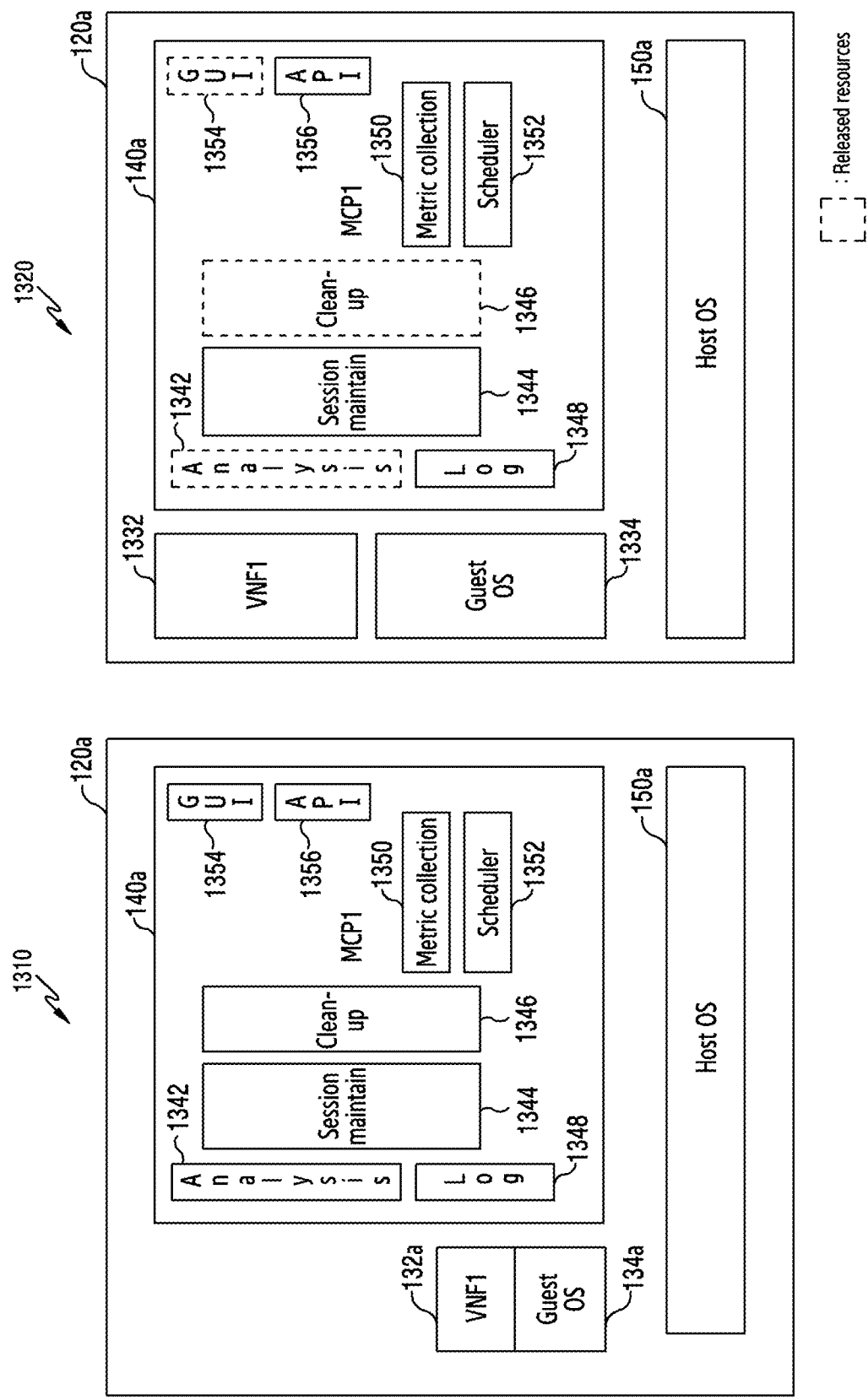
FIG. 13 illustrates an example of performing resource adjustment using resources allocated to some modules of MCP in a cloud system according to various embodiments.

FIG. 13 illustrates an example of performing resource adjustment using resources allocated to some modules of MCP in a cloud system according to various embodiments. According to various embodiments, resource adjustment using resources of some modules in MCP may be performed by the resource management device 100.

Referring to situation 1310, MCP1 140*a* disposed in a host server 120*a* includes an analysis service module 1342, a session maintain service module 1344, a clean-up service module 1346, a log service module 1348, a metric collection service module 1350, a scheduler service module 1352, a GUI service module 1354, and an API service module 1356. All of the MCP modules 1342 to 1356 may be in a situation in which resources are allocated for execution. In a resource allocation situation, such as situation 1310, the resource management device may identify that the resource availability of the host server 120*a* has a value lower than a predetermined value, and at least one of SLA and QoS of guest OS 134*a* and VNF1 132*a* corresponding to UWA does not satisfy a predetermined level, based on the status information received from the host server 120*a*. The resource management device may identify at least one MCP module having lower priority than those of VNF1 132*a* and guest OS 134*a* obtained from information relating to the scheduling policy. Based on a result of the identification, the resource management device may perform resource adjustment as described in situation 1320. According to an embodiment, the resource management device may identify that the priorities of the analysis service module 1342, the clean-up service module 1346, and the GUI service module 1354 are lower than those of VNF1 132*a* and guest OS 134*a*. In this case, the resource management device may release all resources allocated to the analysis service module 1342, the clean-up service module 1346, and the GUI service module 1354, and allocate the released resources to VNF1 132*a* and guest OS 134*a*. According to an embodiment, the resource management device may identify that the priorities of the MCP modules including the analysis service module 1342, the clean-up service module 1346, and the GUI service module 1354 are lower than those of the VNF1 132*a* and the guest OS 134*a*. In this case, if it is determined that SLA and QoS of the guest OS 134*a* and the VNF1 132*a* do not need to release the resources of all the identified modules in MCP in order to satisfy a predetermined level, the resource management device may release the resources of the analysis service module 1342, the clean-up service module 1346, and the GUI service module 1354, and may allocate the released resources to the VNF1 132*a* and the guest OS 134*a*. The VNF1 and the guest OS to which additional resources are allocated may be identified to be VNF1 1332 and guest OS 1334 in situation 1320.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating an apparatus for resource adjustment in a cloud system, the method comprising:
   receiving, from a host server, status information indicating operation performance for a management or control plane (MCP) and one or more user workloads or applications (UWAs) in the host server;
   obtaining information related to a scheduling policy, wherein the information related to the scheduling policy includes information of at least one of high availability (HA) of the MCP and each of the UWAs, priorities of the UWAs or priorities of modules within the MCP;
   based on identifying that the HA of the MCP has a value smaller than predetermined value included in the information related to the scheduling policy, identifying at least one UWA among the UWAs, wherein a priority of each of the at least one UWA is lower than a lowest priority of the modules within the MCP based on the information related to the scheduling policy; and
   performing, for the MCP and the one or more UWAs, an action of reducing a cluster size of the UWAs by releasing resources for the at least one UWA, and an action of increasing a cluster size of the MCP by generating an instance of the MCP using the released resources for the at least one UWA.

2. The method of claim 1, the method further comprising:
   comparing a value of at least one metric, included in the received status information, with a predetermined value included in the information related to the scheduling policy for the host server, to identify a target that a resource increase is required among the MCP or the one or more UWAs;
   identifying a priority of the MCP and priorities of the one or more UWAs, based on the information related to the scheduling policy; and
   identifying the action related to the resource adjustment based on the target that the resource increase is required, the identified priority of the MCP, and the identified priorities of the one or more UWAs.

3. The method of claim 1, wherein the status information includes at least one of:
   the HA for the MCP and each of the one or more UWAs,
   service level agreement (SLA) for the MCP and each of the one or more UWAs,
   quality of service (QoS) for the MCP and each of the one or more UWAs,
   resource availability of the host server, or
   a load level for the MCP and each of the one or more UWAs.

4. The method of claim 1, the method further comprising:
   identifying that at least one of a load level of the MCP, included in the received status information, and a number of data requests for the MCP has a value that is equal to or greater than a predetermined value included in the information related to the scheduling policy;
   identifying whether a number of UWAs with lower priorities than that of the MCP has a value that is equal to or greater than a threshold value, based on the information related to the scheduling policy;
   in response to identifying that the number of UWAs with lower priorities than that of the MCP has a value that is equal to or greater than the threshold value, releasing some virtual central processing unit (CPU) cores of the UWAs and allocating the released virtual CPU cores to the MCP; and
   in response to identifying that the number of UWAs with lower priorities than that of the MCP has a value that is smaller than the threshold value, performing live migration on the UWAs and allocating the virtual CPU cores, that had been allocated to the UWAs, to the MCP.

5. The method of claim 1, the method further comprising:
   identifying that at least one of a load level of the UWA, included in the received status information, and a number of data requests for the UWA has a value that is equal to or greater than a predetermined value included in the information relating to the scheduling policy;
   identifying whether a number of modules in the MCP, with lower priorities than that of the UWA, has a value that is equal to or greater than a threshold value, based on the information relating to the scheduling policy;
   in response to identifying that the number of modules in the MCP, with lower priorities than that of the UWA, has a value that is equal to or greater than the threshold value, determining an action of releasing some virtual central processing unit (CPU) cores of the modules in the MCP and allocating the released virtual CPU cores to the UWA; and
   in response to identifying that the number of modules in the MCP, with lower priorities than that of the UWA, has a value that is smaller than the threshold value, determining an action of performing live migration on the modules in the MCP and allocating the CPU cores, that had been allocated to the modules in the MCP, to the UWA.

6. The method of claim 1, the method further comprising:
   identifying that at least one of a service level agreement (SLA) or a quality of service (QoS) of a first module of the MCP, included in the received status information, has a value smaller than a predetermined value included in the information related to the scheduling policy;
   identifying at least one second module in the MCP with a lower priority than that of the first module, based on the information related to the scheduling policy; and
   identifying an action of releasing resources allocated to the at least one identified second module and allocating the released resources to the first module.

7. The method of claim 1, the method further comprising:
   identifying that at least one of a service level agreement (SLA) and a quality of service (QoS) of the UWA, included in the received status information, has a value smaller than a predetermined value included in the received status information;
   identifying at least one second module in the MCP with a lower priority than that of the UWA, based on the information related to the scheduling policy; and
   identifying an action of releasing resources allocated to the at least one identified module and allocating the released resources to the UWA.

8. The method of claim 1, wherein the status information is periodically transmitted from the host server.

9. The method of claim 1, the method further comprises:
based on identifying that the HA of at least one of UWPs has a value smaller than predetermined value included in the information related to the scheduling policy, identifying at least one module among the modules within the MCP, wherein a priority of each of the at least one module is lower than a lowest priority of the UWAs based on the information related to the scheduling policy; and
performing, for the MCP and the one or more UWAs, an action of reducing the cluster size of the MCP by releasing resources for the at least one module, and an action of increasing the cluster size of the UWA by additionally generating an instance of the UWA using the released resources for the at least one module.

10. An apparatus for resource adjustment in a cloud system, the apparatus comprising:
a transceiver; and
at least one processor operably connected to the transceiver, and configured to:
receive, from a host server, status information indicating operation performance for a management or control plane (MCP) and one or more user workloads or applications (UWAs) in the host server;
obtain information related to a scheduling policy, wherein the information related to the scheduling policy includes information of at least one of high availability (HA) of the MCP and each of the UWAs, priorities of the UWAs or priorities of modules within the MCP;
based on identifying that the HA of the MCP has a value smaller than predetermined value included in the information related to the scheduling policy, identify at least one UWA among the UWAs, wherein a priority of each of the at least one UWA is lower than a lowest priority of the modules within the MCP based on the information related to the scheduling policy; and
perform, for the MCP and the one or more UWAs, an action of reducing a cluster size of the UWAs by releasing resources for the at least one UWA, and an action of increasing a cluster size of the MCP by generating an instance of the MCP using the released resources for the at least one UWA.

11. The apparatus of claim 10, wherein the at least one processor is further configured to:
compare a value of at least one metric, included in the received status information, with a predetermined value included in the information related to the scheduling policy for the host server, to identify a target that a resource increase is required among the MCP or the one or more UWAs;
identify a priority of the MCP and priorities of the one or more UWAs based on the information related to the scheduling policy; and
identify the action related to the resource adjustment based on the target that the resource increase is required, the priority of the identified MCP, and the priorities of the one or more UWAs.

12. The apparatus of claim 10, wherein the status information includes at least one of:
the HA for the MCP and each of the one or more UWAs, service level agreement (SLA) for the MCP and each of the one or more UWAs,
quality of service (QoS) for the MCP and each of the one or more UWAs,
resource availability of the host server, or
a load level for the MCP and each of the one or more UWAs.

13. The apparatus of claim 10, wherein the at least one processor is further configured to:
identify that at least one of a load level of the MCP, included in the received status information, and a number of data requests for the MCP has a that is value equal to or greater than a predetermined value included in the information related to the scheduling policy;
identify whether a number of UWAs with lower priorities than that of the MCP has a value that is equal to or greater than a threshold value, based on the information related to the scheduling policy;
in response to identifying that the number of UWAs with lower priorities than that of the MCP has a value that is equal to or greater than the threshold value, release some virtual central processing unit (CPU) cores of the UWAs and allocate the released virtual CPU cores to the MCP; and
in response to identifying that the number of UWAs with lower priorities than that of the MCP has a value that is smaller than the threshold value, perform live migration on the UWAs and allocate the virtual CPU cores, that had been allocated to the UWAs, to the MCP.

14. The apparatus of claim 10, wherein the at least one processor is further configured to:
identify that at least one of a load level of UWA, included in the received status information, and a number of data requests for the UWA has a value that is equal to or greater than a predetermined value included in the information related to the scheduling policy;
identify whether a number of modules in the MCP, with lower priorities than that of the UWA, has a value that is equal to or greater than a threshold value, based on the information related to the scheduling policy;
in response to identifying that the number of modules in the MCP, with lower priorities than that of the UWA, has a value that is equal to or greater than the threshold value, determine an action of releasing some virtual central processing unit (CPU) cores of the modules in the MCP and allocating the released virtual CPU cores to the UWA; and
in response to identifying that the number of modules in the MCP, with lower priorities than that of the UWA, has a value that is smaller than the threshold value, determine an action of performing live migration on the modules in the MCP and allocating the virtual CPU cores, that had been allocated to the modules in the MCP, to the UWA.

15. The apparatus of claim 10, wherein the at least one processor is further configured to:
identify that at least one of a service level agreement (SLA) or a quality of service (QoS) of a first module of the MCP, included in the received status information, has a value smaller than a predetermined value included in the information related to the scheduling policy;
identify at least one second module in the MCP, the second module with a lower priority than that of the first module, based on the information related to the scheduling policy; and
identify an action of releasing resources allocated to the at least one identified second module and allocating the released resources to the first module.

16. The apparatus of claim 10, wherein the at least one processor is further configured to:
- identify that at least one of a service level agreement (SLA) and a quality of service (QoS) of UWA, included in the received status information, has a value smaller than a predetermined value included in the received status information;
- identify at least one second module in the MCP with a lower priority than that of the UWA, based on the information related to the scheduling policy; and
- identify an action of releasing resources allocated to the at least one identified module and allocating the released resources to the UWA.

17. The apparatus of claim 10, wherein the status information is periodically transmitted from the host server.

18. The apparatus of claim 10, the at least one processor is further configured to:
- based on identifying that the HA of at least one of UWPs has a value smaller than predetermined value included in the information related to the scheduling policy, identify at least one module among the modules within the MCP, wherein a priority of each of the at least one module is lower than a lowest priority of the UWAs based on the information related to the scheduling policy; and
- perform, for the MCP and the one or more UWAs, an action of reducing the cluster size of the MCP by releasing resources for the at least one module, and an action of increasing the cluster size of the UWA by additionally generating an instance of the UWA using the released resources for the at least one module.

* * * * *